United States Patent
Saito et al.

(10) Patent No.: US 10,371,820 B2
(45) Date of Patent: Aug. 6, 2019

(54) POSITIONING DEVICE

(71) Applicant: MITSUBISHI ELECTRIC CORPORATION, Chiyoda-ku (JP)

(72) Inventors: Masayuki Saito, Tokyo (JP); Masakazu Miya, Tokyo (JP); Yuki Sato, Tokyo (JP); Seigo Fujita, Tokyo (JP); Kazuhiro Terao, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 259 days.

(21) Appl. No.: 15/128,005

(22) PCT Filed: Mar. 28, 2014

(86) PCT No.: PCT/JP2014/059098
§ 371 (c)(1),
(2) Date: Sep. 21, 2016

(87) PCT Pub. No.: WO2015/145718
PCT Pub. Date: Oct. 1, 2015

(65) Prior Publication Data
US 2017/0131408 A1 May 11, 2017

(51) Int. Cl.
*G01S 19/22* (2010.01)
*G01S 19/39* (2010.01)
(Continued)

(52) U.S. Cl.
CPC ............... *G01S 19/22* (2013.01); *G01S 19/39* (2013.01); *G01S 19/44* (2013.01)

(58) Field of Classification Search
CPC ........... G01S 19/22; G01S 19/39; G01S 19/44
See application file for complete search history.

(56) References Cited

U.S. PATENT DOCUMENTS 5,148,179 A * 9/1992 Allison .................. G01S 19/44
342/357.31
5,165,051 A * 11/1992 Kumar .................. H03L 7/087
324/76.39
(Continued)

FOREIGN PATENT DOCUMENTS

JP 2001-116820 A 4/2001
JP 2002-323552 A 11/2002
(Continued)

OTHER PUBLICATIONS

International Search Report dated Jul. 1, 2014 in PCT/JP2014/059098 filed Mar. 28, 2014.
(Continued)

*Primary Examiner* — Bernarr E Gregory
(74) *Attorney, Agent, or Firm* — Oblon, McClelland, Maier & Neustadt, L.L.P.

(57) ABSTRACT

An observation data screening unit (103) executes least squares method positioning using, as an observation amount, n (n is an integer of 3 or larger) number of single difference amounts of an L1-wave pseudorange obtained from n pieces of observation data from n number of positioning satellites and n pieces of correction data corresponding to the n pieces of the observation data. The observation data screening unit (103) calculates a sum of squares of n residuals obtained for each positioning satellite by executing the least squares method positioning and normalizes the n residuals. The observation data screening unit (103) then evaluates the sum of squares of the residuals and the n normalized residuals.

11 Claims, 19 Drawing Sheets

(51) Int. Cl.
*G01S 19/44* (2010.01)
*G01S 19/00* (2010.01)

(56) References Cited

U.S. PATENT DOCUMENTS

| | | | |
|---|---|---|---|
| 5,563,917 | A | 10/1996 | Sheynblat |
| 5,796,773 | A | 8/1998 | Shynblat |
| 5,914,685 | A | 6/1999 | Kozlov et al. |
| 6,229,479 | B1 | 5/2001 | Kozlov et al. |
| 6,397,147 | B1 | 5/2002 | Whitehead |
| 6,407,700 | B1 | 6/2002 | Giffard |
| 6,917,330 | B2 | 7/2005 | Ohmura et al. |
| 7,439,908 | B1 | 10/2008 | Zhodzishsky et al. |
| 7,710,316 | B1 | 5/2010 | Zhodzishsky et al. |
| 7,728,768 | B2 | 6/2010 | Mitsunaga |
| 7,884,759 | B2 | 2/2011 | Mitsunaga |
| 7,961,143 | B2 | 6/2011 | Dai et al. |
| 8,035,552 | B2 | 10/2011 | Dai et al. |
| 8,130,143 | B2 | 3/2012 | Liu et al. |
| 8,242,953 | B2 | 8/2012 | Dai et al. |
| 8,760,343 | B2 | 6/2014 | Milyutin et al. |
| 8,760,344 | B2 | 6/2014 | Mercier |
| 9,170,335 | B2 | 10/2015 | Chen |
| 2007/0052583 | A1* | 3/2007 | Zhodzishsky .......... G01S 19/43 342/357.24 |
| 2008/0297408 | A1 | 12/2008 | Dai |
| 2009/0102708 | A1 | 4/2009 | Dai et al. |
| 2010/0302096 | A1* | 12/2010 | Ammann .............. G01S 19/42 342/357.25 |
| 2011/0115669 | A1 | 5/2011 | Milyutin et al. |
| 2011/0187590 | A1 | 8/2011 | Leandro |
| 2012/0046863 | A1* | 2/2012 | Hope .................... G01S 19/39 701/531 |
| 2014/0240172 | A1 | 8/2014 | Milyutin et al. |
| 2017/0131408 | A1 | 5/2017 | Saito et al. |
| 2018/0113473 | A1 | 4/2018 | Webber et al. |

FOREIGN PATENT DOCUMENTS

| | | | |
|---|---|---|---|
| JP | 2005-233714 | A | 9/2005 |
| JP | 2006-105721 | A | 4/2006 |
| JP | 2008-292454 | A | 12/2008 |
| JP | 2009-243940 | A | 10/2009 |
| JP | 2009-257802 | A | 11/2009 |
| JP | 2009-294067 | A | 12/2009 |
| JP | 2010-112724 | A | 5/2010 |
| JP | 2010-528321 | A | 8/2010 |
| JP | 2013-511038 | A | 3/2013 |
| JP | 2013-148524 | A | 8/2013 |
| JP | 2014-16315 | A | 1/2014 |
| JP | 2014/153087 | A | 8/2014 |
| WO | WO 2008/150389 | A1 | 12/2008 |
| WO | 2009/028929 | A1 | 3/2009 |
| WO | 2012/114620 | A1 | 8/2012 |

OTHER PUBLICATIONS

Office Action dated May 31, 2018 in Australian Patent Application No. 2014388688.

Ziyi Jiang, et al., "Multi-Constellation GNSS Multipath Mitigation Using Consistency Checking", Proceedings of the 24th International Technical Meeting of the Satellite Division of the Institute of Navigation, Sep. 2011, pp. 3889-3902.
Extended European Search Report dated Mar. 1, 2018 in European Patent Application No. 14886896.1, 19 pages.
George Chia Liu, et al., "Ionosphere Weighted GPS Cycle Ambiguity Resolution", Proceedings of the 2002 National Technical Meeting of the Institute of Navigation, ION NTM 2002. XP056004759. Jan. 30, 2002, pp. 889-899.
Dennis Odijk, "Fast Precise GPS Positioning in the presence of ionospheric delays", Delft university of Technology, XP055454008, Dec. 17, 2002, pp. 1-242 with cover pages.
Office Action dated Mar. 28, 2017 in Japanese Patent Application No. 2016-509818 (with English translation).
Office Action dated Mar. 28, 2017 in Japanese Patent Application No. 2016-509817 (with English translation).
U.S. Appl. No. 15/127,993, filed Sep. 21, 2016, Masayuki Saito, et al.
Partial Supplementary European Search Report dated Jan. 3, 2018 in Patent Application No. 14886896.1, 16 pages.
Extended European Search Report dated Jan. 2, 2018 in Patent Application No. 14886890.4, 12 pages.
Masayuki Saito, et al. "Centimeter-class Augmentation System Utilizing Quasi-Zenith Satellite System", 24th International Technical Meeting of the Satellite Division of the Institute of Navigation, XP056000869, 2011, pp. 1243-1253.
Per Enge, et al. "Wide Area Augmentation of the Global Positioning System", Proceeding of the IEEE, vol. 84, No. 8, XP011043736, 1996, pp. 1063-1088.
Mark Caissy, et al. "Coming Soon: The International GNSS Real-Time Service", GPS World, vol. 23, No. 6, XP055435899, 2012, pp. 52-58.
Australian Office Action dated Jun. 27, 2017 in Patent Application No. 2014388689.
Australian Office Action dated Jun. 10, 2017 in Patent Application No. 2014388688.
Australian Office Action dated Nov. 7, 2017 in Australian Patent Application No. 2014388688.
Office Action dated Mar. 26, 2018 in Australian Patent Application No. 2014388688.
Office Action dated Jul. 2, 2018 in co-pending U.S. Appl. No. 15/127,993, 36 pages.
Office Action dated Oct. 5, 2018 in corresponding Australian Patent Application No. 2018200386, 4 pages.
Extended European Search Report dated Dec. 19, 2018 in Patent Application No. 18191453.2.
Frank Kleijer, "Troposphere Modeling and Filtering for Precise GPS Leveling", https://repository.tudelft.nl/islandora/object/uuid%3Aealf0cf0-4e48-42lb-b7ae-4ae3e36d1880, XP055531031, Apr. 2004, 281 pages.
Pawel Welgosz, "Quality assessment of GPS rapid static positioning with weighted ionospheric parameters in generalized least squares", GPS Solutions, vol. 15, No. 2, XP055531056, 2011, pp. 89-99.
Office Action dated Feb. 7, 2019 in U.S. Appl. No. 15/127,993.
Office Action dated Mar. 13. 2019, in Europe Patent Application No. 14 886 890.4-1206 (6 pgs.).
Office Action dated May 23, 2019, in Australia Patent Application No. 2018204054. (6 pgs.)

* cited by examiner

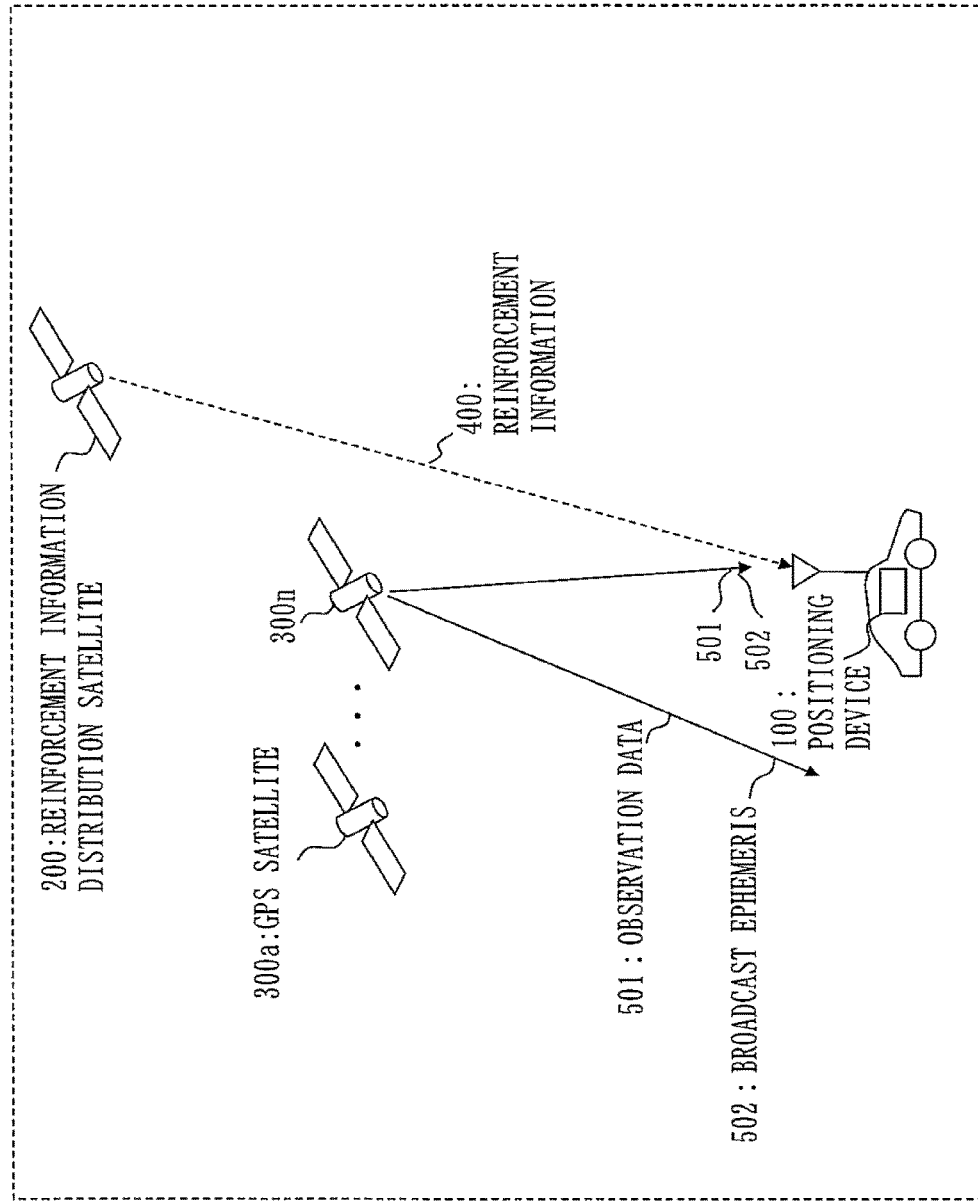

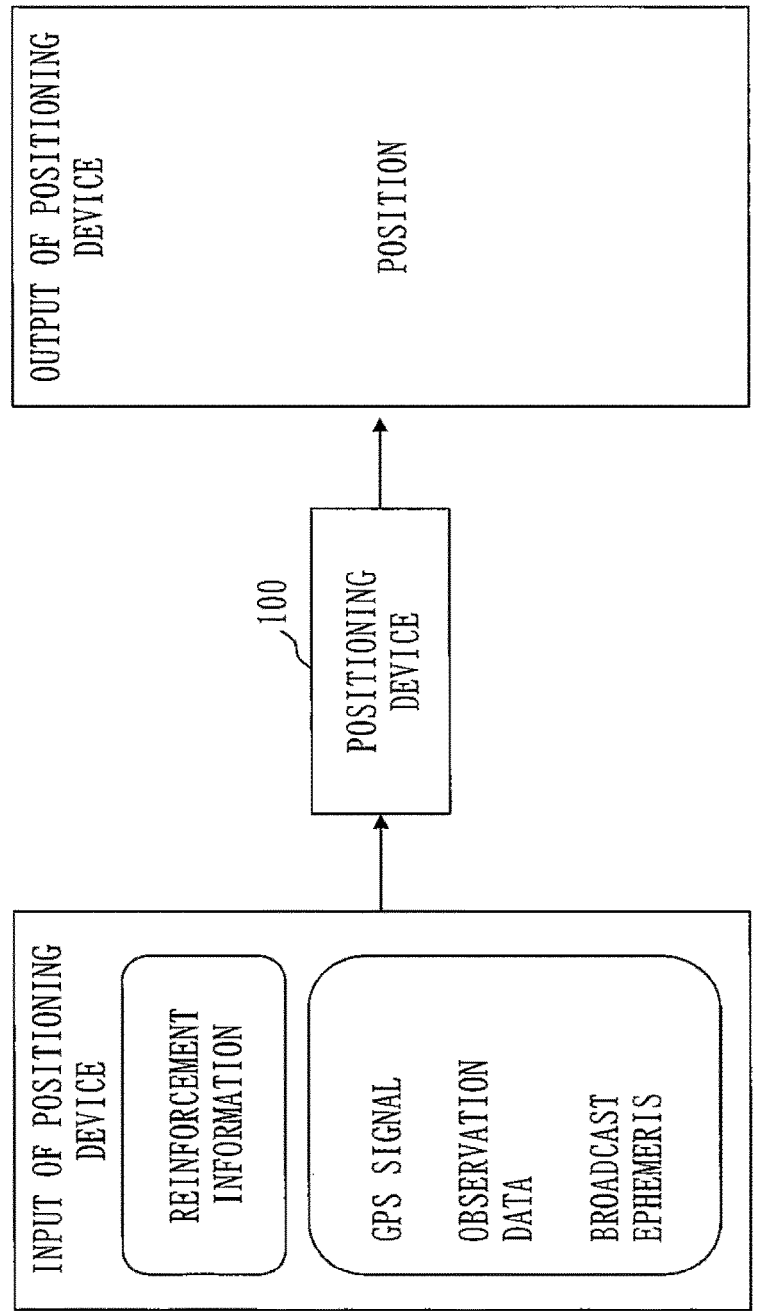

Fig. 3

| No | INPUT/OUTPUT DATA | DATA UPDATE CYCLE DATA OUTPUT CYCLE | DESCRIPTION |
|---|---|---|---|
| 1 | OBSERVATION DATA | 0.1~1.0sec | DISTANCE BETWEEN SATELLITE AND POSITIONING POINT (ANTENNA POSITION) |
| 2 | BROADCAST EPHEMERIS (EPHEMERIS) | ABOUT 2 H | DATA USED TO CALCULATE SATELLITE POSITION |
| 3 | REINFORCEMENT INFORMATION | TWO TYPES : 5, 30sec | DATA USED TO CALCULATE ERROR INCLUDED IN OBSERVATION DATA RECEIVED AT POSITIONING POINT |
| 4 | POSITION | EQUAL TO OBSERVATION DATA | ABSOLUTE POSITION (ACCURATE ON THE ORDER OF CM) OF POSITIONING POINT CALCULATED BY POSITIONING DEVICE ON THE BASIS OF Nos. 1 TO 3 |

Fig. 4

| | L1 WAVE FREQUENCY WAVELENGTH λ (1) = ABOUT 19 cm | L2 WAVE FREQUENCY WAVELENGTH λ (2) = ABOUT 24 cm | DESCRIPTION |
|---|---|---|---|
| PSEUDORANGE [m] | PSEUDORANGE FOR L1 WAVE OF SATELLITE i (HEREINAFTER DENOTED AS P (i, 1)) | PSEUDORANGE FOR L2 WAVE OF SATELLITE i (HEREINAFTER DENOTED AS P (i, 2)) | REPRESENTS DISTANCE BETWEEN SATELLITE AND POSITIONING POINT, WHERE "PSEUDO" INDICATES THAT VARIOUS TYPES OF BIAS ERRORS ARE INCLUDED. NOISE OTHER THAN BIAS ERRORS HAS MAGNITUDE ON THE ORDER OF METERS. |
| CARRIER PHASE [cycle] | CARRIER PHASE FOR L1 WAVE OF SATELLITE i (HEREINAFTER DENOTED AS Φ (i, 1)) | CARRIER PHASE FOR L2 WAVE OF SATELLITE i (HEREINAFTER DENOTED AS Φ (i, 2)) | MULTIPLIED BY WAVELENGTH TO REPRESENT DISTANCE BETWEEN SATELLITE AND POSITIONING POINT. HAS ROUGHLY THE SAME TYPE OF BIAS ERROR AS PSEUDORANGE, BUT ALSO INCLUDES UNKNOWN BIAS ERROR (HEREINAFTER CALLED AMBIGUITY*) RESULTING FROM RECEIVER CORRESPONDING TO INTEGER WAVELENGTH. NOISE OTHER THAN BIAS ERROR HAS MAGNITUDE ON THE ORDER OF MILLIMETERS.<br><br>* MAGNITUDE OF AMBIGUITY VARIES FOR EACH SATELLITE SIGNAL BUT DOES NOT VARY WHILE THE SAME SATELLITE SIGNAL CONTINUES TO BE RECEIVED. |

Fig. 6

ERRORS OF GPS SIGNAL

| REINFORCEMENT INFORMATION | HIGH RATE (UPDATED EVERY FIVE SECONDS) (FREQUENCY-INDEPENDENT ERROR) | LOW RATE (UPDATED EVERY 30 SECONDS) (FREQUENCY-DEPENDENT ERROR) |
|---|---|---|
| NO SPATIAL FLUCTUATION | · SATELLITE CLOCK ERROR<br>· SATELLITE ORBIT ERROR*<br>· INTER-FREQUENCY BIAS*<br>(L0 BIAS, ISB) | · INTER-FREQUENCY BIAS<br>(L1 AND L2 BIAS, ISB) |
| HAS SPATIAL FLUCTUATION | · TROPOSPHERIC DELAY ERROR*<br>* UPDATED EVERY FIVE SECONDS BY CONSISTENCY | · IONOSPHERIC DELAY ERROR |

$$\text{L0 BIAS} = \frac{F_1^2}{F_1^2 - F_2^2}(\text{L1 BIAS}) - \frac{F_2^2}{F_1^2 - F_2^2}(\text{L2 BIAS}) \quad \cdots \text{EXPRESSION 1}$$

F1 AND F2 REPRESENT FREQUENCIES OF L1 AND L2 WAVES

NOT INCLUDED IN CORRECTION DATA
· RECEIVER CLOCK ERROR
· RECEIVER NOISE (PSEUDORANGE ON THE ORDER OF METERS, PHASE ON THE ORDER OF MILLIMETERS), MULTIPATH
· AMBIGUITY (ONLY FOR PHASE)

NOT INCLUDED IN REINFORCEMENT INFORMATION
· PHASE WIND UP EFFECT
· EARTH TIDE EFFECT

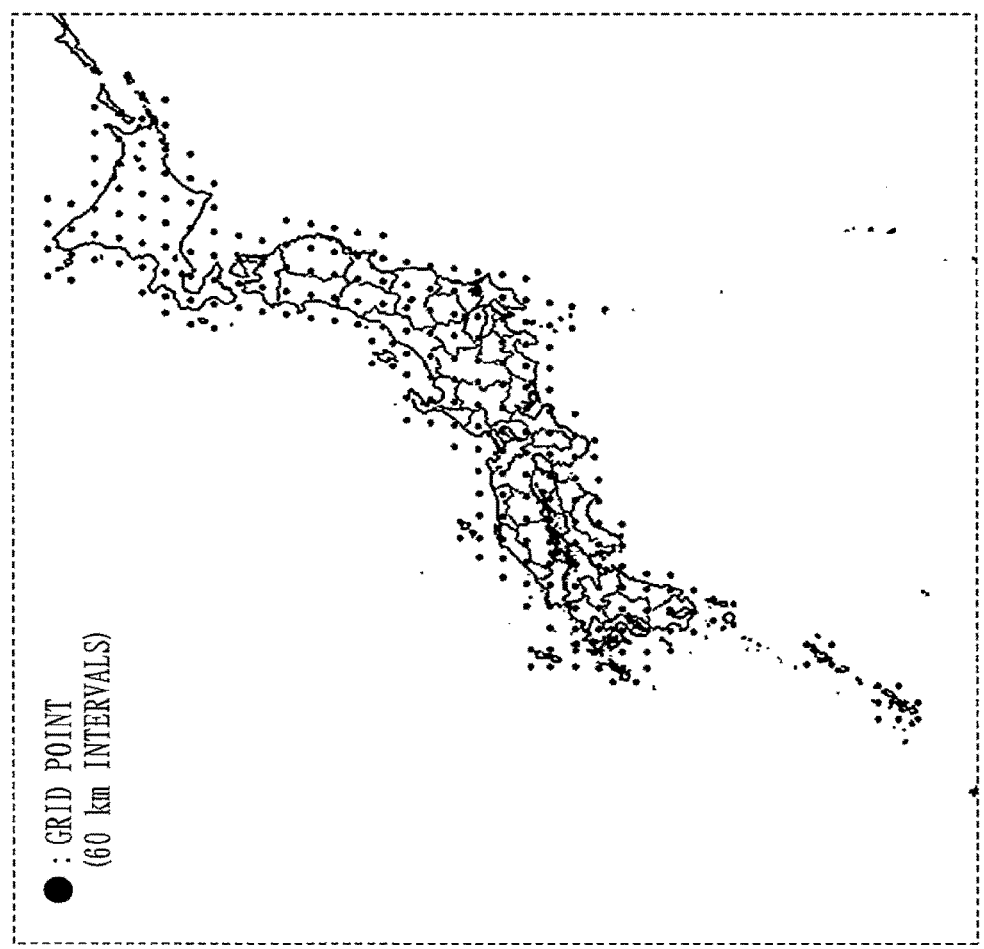

Fig. 9

| No | COMPONENT | DESCRIPTION | NOTE |
|---|---|---|---|
| 101 | APPROXIMATE POSITION/SATELLITE POSITION CALCULATION UNIT | CALCULATE APPROXIMATE POSITION OF POSITIONING POINT AND POSITION OF EACH SATELLITE | APPROXIMATE POSITION IS CALCULATED BY INDEPENDENT POSITIONING |
| 102 | CORRECTION DATA CREATION UNIT | CREATE CORRECTION DATA FROM REINFORCEMENT INFORMATION, APPROXIMATE POSITION, AND SATELLITE POSITION | |
| 103 | OBSERVATION DATA SCREENING UNIT | ELIMINATE OBSERVATION DATA EXPECTED TO BE DEGRADED IN QUALITY | |
| 104 | OBSERVATION DATA ERROR CORRECTION UNIT | CALCULATE DOUBLE DIFFERENCE DATA OF OBSERVATION DATA | REFER TO SECTION 4. 2. 1 |
| 105 | TIME EXTRAPOLATION CALCULATION UNIT | ESTIMATE STATE QUANTITY $X(t)$ OF CURRENT TIME FROM STATE QUANTITY $X^{\hat{}}(t-\Delta t)$ OF PREVIOUS TIME $X^{\hat{}}(t-\Delta t) = \Phi \cdot X(t)$ | $\Phi$ IS MATRIX DETERMINED ACCORDING TO DYNAMIC MODEL IN MATRIX. REFER TO SECTION 4. 2. 2 FOR DETAIL |
| 106 | GEOMETRIC DISTANCE CALCULATION UNIT | CALCULATE GEOMETRIC DISTANCE | |
| 107 | RESIDUAL CALCULATION UNIT | CALCULATE DOUBLE DIFFERENCE RESIDUAL FROM DOUBLE DIFFERENCE DATA AND GEOMETRIC DISTANCE | |
| 108 | OBSERVATION UPDATE CALCULATION UNIT | UPDATE STATE QUANTITY SUCH THAT ESTIMATED ERROR OF STATE QUANTITY IS THE SMALLEST | REFER TO SECTION 4. 2. 2 FOR DETAIL |
| 109 | AMBIGUITY CALCULATION UNIT | CALCULATE AMBIGUITY BEING BIAS ERROR OF CARRIER PHASE UPDATE STATE QUANTITY ON THE BASIS OF CALCULATION RESULT | |
| 110 | DOUBLE DIFFERENCE RESIDUAL ANALYSIS UNIT | IDENTIFY OBSERVATION DATA SUSPECTED OF BEING INFLUENCED BY MULTIPATH INSTRUCT RECALCULATION OF AMBIGUITY WHEN CYCLE SLIP IS SUSPECTED | |

Fig.10

| No | INTERMEDIATE DATA | DESCRIPTION | NOTE |
|---|---|---|---|
| 151 | APPROXIMATE POSITION | POSITION OF POSITIONING POINT THAT IS CALCULATED BY INDEPENDENT POSITIONING AND ACCURATE ON THE ORDER OF METERS | |
| 152 | SATELLITE POSITION | POSITION OF EACH SATELLITE TRANSMITTING OBSERVATION DATA | |
| 153 | CORRECTION DATA | ERROR EXPECTED TO BE INCLUDED IN OBSERVATION DATA RECEIVED AT POSITIONING POINT FROM EACH SATELLITE | |
| 154 | DOUBLE DIFFERENCE DATA | AMOUNT OBTAINED BY SUBTRACTING OBSERVATION DATA OF MASTER SATELLITE FROM OBSERVATION DATA OF SLAVE SATELLITE | REFER TO SECTION 4. 2. 1 |
| 155 | GEOMETRIC DISTANCE | DISTANCE BETWEEN POSITIONING POINT AND SATELLITE CALCULATED FROM POSITION OF POSITIONING POINT AND SATELLITE POSITION | |
| 156 | DOUBLE DIFFERENCE RESIDUAL | DOUBLE DIFFERENCE AMOUNT CALCULATED BY RESIDUAL (i) = DOUBLE DIFFERENCE DATA - STATE QUANTITY | REFER TO SECTION 4. 2. 1 |

Fig. 15

| SYMBOL | NAME | DESCRIPTION | SUPPLEMENTAL INFORMATION |
|---|---|---|---|
| x | STATE QUANTITY VECTOR | QUANTITY ESTIMATING POSITION/VELOCITY AND THE LIKE | (-) INDICATES PREVIOUS EPOCH, AND (+) INDICATES CURRENT EPOCH |
| P | ERROR COVARIANCE MATRIX | COVARIANCE MATRIX OF ESTIMATED ERROR OF STATE QUANTITY | NO HAT/HAT INDICATE BEFORE/AFTER OBSERVATION IS UPDATED |
| Q | PROCESS NOISE MATRIX | ERROR IN DYNAMIC MODEL | DESIGN VALUE |
| Φ | TRANSITION MATRIX | MATRIX REPRESENTING TEMPORAL TRANSITION OF STATE QUANTITY | DETERMINED BY DYNAMIC MODEL ADOPTED |
| y | OBSERVATION AMOUNT VECTOR | OBSERVATION DATA = GPS SIGNAL | |
| R | OBSERVATION NOISE MATRIX | MATRIX REPRESENTING NOISE IN OBSERVATION DATA | DESIGN VALUE |
| H | OBSERVATION MATRIX | MATRIX REPRESENTING RELATIONSHIP BETWEEN STATE QUANTITY AND OBSERVATION AMOUNT | DETERMINED BY OBSERVATION MODEL ADOPTED |

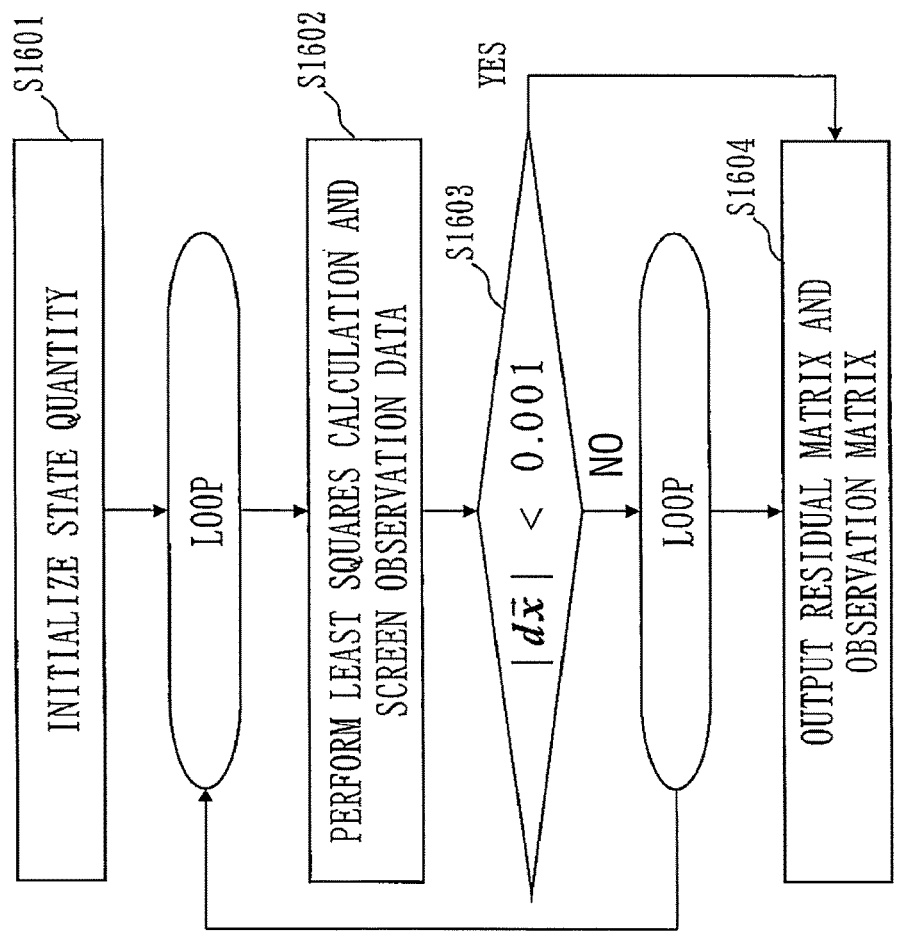

Fig. 17

| EXPRESSION | DESCRIPTION |
|---|---|
| STATE QUANTITY $$\bar{x} = (x \ y \ z \ c \cdot dt)$$ | POSITION OF POSITIONING POINT : (x y z) DIFFERENCE IN RECEIVER CLOCK ERROR : c·dt INITIAL VALUE IS (0 0 0 0) |
| OBSERVATION AMOUNT $$\Delta P(i,1) = P_{\text{POSITIONING POINT}}(i,1) - P_{\text{REFERENCE POINT}}(i,1)$$ $$= P_{\text{POSITIONING POINT}}(i,1)$$ $$- \left( \sqrt{(X_i - x)^2 + (Y_i - y)^2 + (Z_i - z)^2} + \text{L1PRC}(i) \right)$$ OBSERVATION MODEL $$\Delta P_i = h_i(\bar{x})$$ $$= \sqrt{(X_i - x')^2 + (Y_i - y')^2 + (Z_i - z')^2}$$ $$- \sqrt{(X_i - x')^2 + (Y_i - y')^2 + (Z_i - z')^2} + c \cdot dt$$ | REFERENCE POINT FOR SINGLE DIFFERENCE OF L1-WAVE PSEUDORANGE = APPROXIMATE POSITION FOR WHICH REINFORCEMENT INFORMATION IS CALCULATED APPROXIMATE POSITION OF POSITIONING POINT $(x' \ y' \ z')$ POSITION OF SATELLITE i $(X_i, Y_i, Z_i)$ i REPRESENTS SATELLITE IDENTIFICATION INDEX c REPRESENTS SPEED OF LIGHT $\Delta P_i$ REPRESENTS OBSERVATION AMOUNT ESTIMATED FROM STATE QUANTITY |

Fig. 18

| EXPRESSION | DESCRIPTION |
|---|---|
| OBSERVATION EQUATION<br>$dz_i = \Delta P(i,1) - \Delta P_i$<br>$= \nabla h_i(\vec{x}) \cdot d\vec{x}$<br>$= \left( -\dfrac{X_i - x}{\rho_i} \quad -\dfrac{Y_i - y}{\rho_i} \quad -\dfrac{Z_i - z}{\rho_i} \quad 1 \right) \cdot d\vec{x}$<br>$\rho_i = \sqrt{(X_i - x)^2 + (Y_i - y)^2 + (Z_i - z)^2}$<br>$d\vec{z} = H \cdot d\vec{x}$<br>$= \begin{pmatrix} -\dfrac{X_1 - x}{\rho_1} & -\dfrac{Y_1 - y}{\rho_1} & -\dfrac{Z_1 - z}{\rho_1} & 1 \\ -\dfrac{X_2 - x}{\rho_2} & -\dfrac{Y_2 - y}{\rho_2} & -\dfrac{Z_2 - z}{\rho_2} & 1 \\ \vdots & \vdots & \vdots & \vdots \\ -\dfrac{X_n - x}{\rho_n} & -\dfrac{Y_n - y}{\rho_n} & -\dfrac{Z_n - z}{\rho_n} & 1 \end{pmatrix} \begin{pmatrix} x \\ y \\ z \\ cdt \end{pmatrix}$ | $d\vec{x}$ INDICATES OBSERVATION RESIDUAL<br>$H$ INDICATES OBSERVATION MATRIX<br>$\rho_i$ INDICATES GEOMETRIC DISTANCE |
| LEAST SQUARES CALCULATION<br>$d\vec{x} = (H^T H)^{-1} H^T d\vec{z}$<br>$\vec{x} \Leftarrow \vec{x} + d\vec{x}$ | |

POSITIONING DEVICE

TECHNICAL FIELD

The present invention relates to a positioning device that performs satellite positioning.

BACKGROUND ART

Various errors are included in GNSS (Global Navigation Satellite System) observation data transmitted from a satellite positioning system (GNSS) such as a GPS

Global Positioning System

The errors included in the GNSS observation data need to be eliminated in order to realize highly accurate positioning.

Patent Literature 1 discloses a technique of eliminating an error by performing double difference calculation of the error associated with a pseudorange and a carrier phase, for example.

CITATION LIST

Patent Literature

Patent Literature 1: JP 2009-257802 A

SUMMARY OF INVENTION

Technical Problem

Multipath is one cause of degrading positioning accuracy.

The multipath is a phenomenon that occurs when a GNSS signal including the observation data reaches an antenna of a positioning device via a plurality of paths.

The multipath occurs when, for example, a GNSS signal (multipath signal) reaching the antenna of the positioning device after reflected off a building or the like interferes with a GNSS signal directly reaching the antenna.

Urban areas with many buildings and mountainous areas with many forests are prone to the multipath, thus a multipath signal needs to be eliminated in order to realize highly accurate positioning in these areas.

The multipath signal is strongly dependent on a reception environment at a positioning point, and so correction data used to eliminate the multipath signal cannot be distributed.

Moreover, a degree to which the GNSS signal is influenced by the multipath varies for each GNSS signal, so that the multipath signal cannot be eliminated by the double difference calculation described in Patent Literature 1.

The present invention has been made in consideration of such circumstances, where a main object of the present invention is to eliminate observation data influenced by the multipath in order to realize highly accurate positioning.

Solution to Problem

A positioning device according to the present invention includes:

a least squares method positioning execution unit to execute least squares method positioning by using, as an observation amount, n (n is an integer of 3 or larger) number of single difference amounts of an L1-wave pseudorange obtained from n pieces of observation data from n number of positioning satellites and n pieces of correction data corresponding to the n pieces of observation data;

a sum-of-squares calculation unit to calculate a sum of squares of n residuals obtained for each positioning satellite by executing the least squares method positioning;

a normalization unit to normalize the n residuals; and an evaluation unit to evaluate the sum of squares calculated by the sum-of-squares calculation unit and the n residuals normalized by the normalization unit.

Advantageous Effects of Invention

Residuals vary greatly between observation data influenced by the multipath, and an individual residual is large in the observation data influenced by the multipath.

In the present invention, the observation data influenced by the multipath can be eliminated by evaluating the variation of the residual on the basis of an evaluation on a sum of squares of the residual and by evaluating the amount of individual residual on the basis of an evaluation on a normalized residual.

BRIEF DESCRIPTION OF DRAWINGS

FIG. 1 is a diagram illustrating a configuration example of a positioning system according to a first embodiment.

FIG. 2 is a diagram illustrating input/output of a positioning device according to the first embodiment.

FIG. 3 is a table illustrating input/output data of the positioning device according to the first embodiment.

FIG. 4 is a table illustrating observation data according to the first embodiment.

FIG. 6 is a diagram illustrating a relationship between an error in the GPS signal and reinforcement information according to the first embodiment.

FIG. 7 is a diagram illustrating a grid point according to the first embodiment.

FIG. 9 is a table illustrating elements of the positioning device according to the first embodiment.

FIG. 10 is a table illustrating intermediate data of the positioning device according to the first embodiment.

FIG. 15 is a table illustrating a vector and a matrix used in the Kalman filter according to the first embodiment.

FIG. 16 is a flowchart illustrating a procedure of least squares method positioning according to the first embodiment.

FIG. 17 is a table illustrating a calculation expression of the least squares method positioning according to the first embodiment.

FIG. 18 is a table illustrating a calculation expression of the least squares method positioning according to the first embodiment.

DESCRIPTION OF EMBODIMENTS

First Embodiment

1. System Configuration

Figure 5:
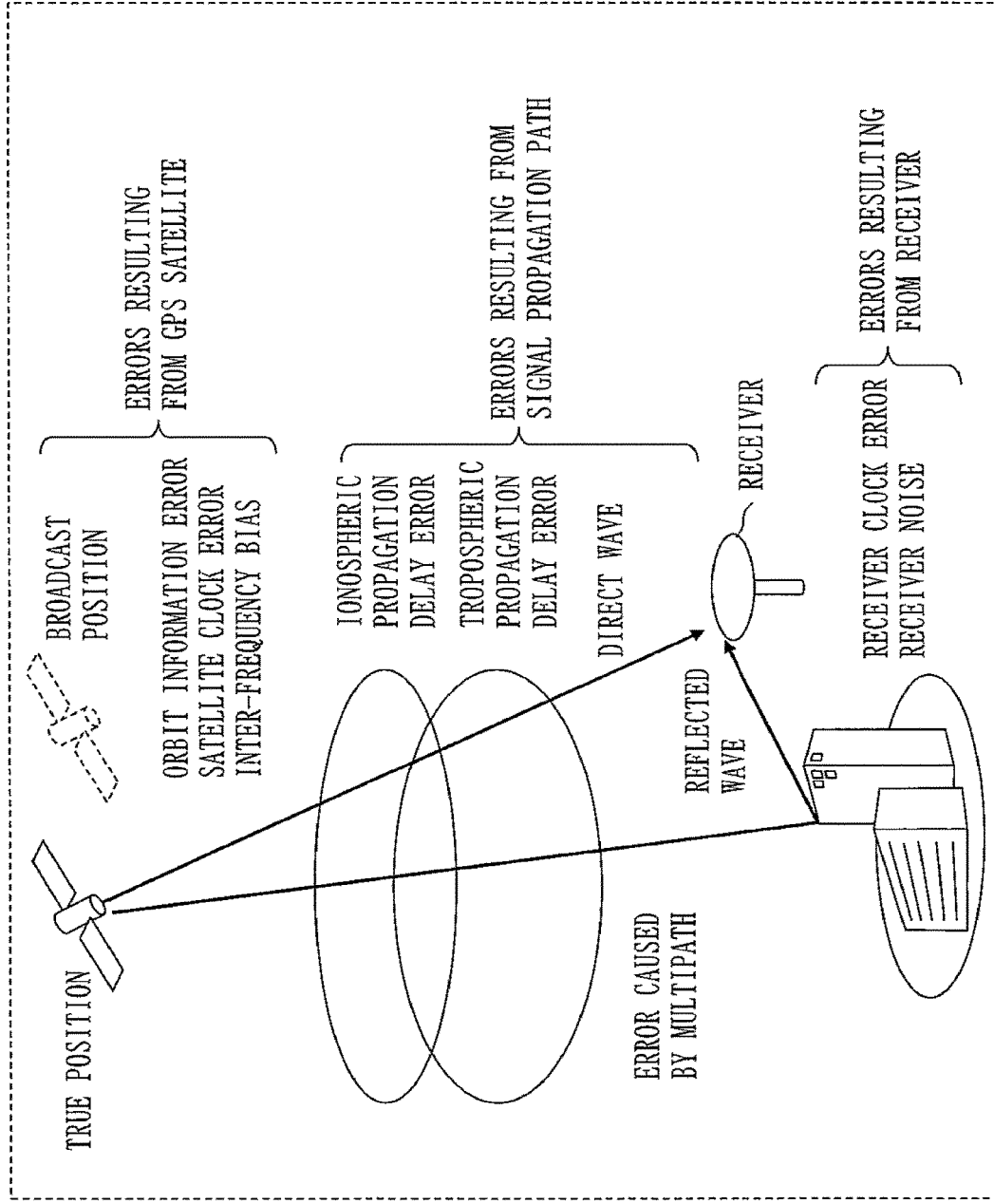
FIG. 5 is a diagram illustrating a source of error included in a GPS signal according to the first embodiment.

FIG. 1 is a diagram illustrating a configuration example of a positioning system according to the present embodiment.

An example described below uses a GPS satellite as a positioning satellite.

Instead of the GPS satellite, there may be used a GNSS such as GLONASS, Galileo, and BeiDou or an RNSS (Regional Navigation Satellite System) such as a quasi-zenith satellite.

As illustrated in FIG. 1, a positioning device 100 is mounted to a mobile body such as an automobile.

The positioning device 100 receives observation data 501 and a broadcast ephemeris 502 transmitted from a GPS satellite 300.

The broadcast ephemeris 502 is also called an ephemeris.

The positioning device 100 also receives reinforcement information 400 transmitted from a reinforcement information distribution satellite 200.

An operation of the positioning device 100 will be mainly described in the present embodiment and a second embodiment.

The reinforcement information distribution satellite 200 receives reinforcement information from a ground station not shown in FIG. 1, and distributes the received reinforcement information as the reinforcement information 400.

The GPS satellite 300 being a positioning satellite transmits the observation data 501 and the broadcast ephemeris 502.

The positioning device 100 needs to acquire four or more of the GPS satellite 300 in order to perform positioning.

2. Overview of Operation of Positioning Device 100

Here, there will be described an overview of the operation of the positioning device 100 described in the present embodiment and the second embodiment.

As illustrated in FIG. 2, the positioning device 100 receives the observation data 501 and the broadcast ephemeris 502 as a GPS signal and the reinforcement information 400.

The positioning device 100 then uses the reinforcement information 400 as well as the observation data 501 and the broadcast ephemeris 502 to calculate the position of a positioning point (the position of the positioning device 100).

FIG. 3 illustrates the observation data 501, the broadcast ephemeris 502, the reinforcement information 400 and the position in detail.

3.1. Observation Data

A pseudorange between the positioning point and the GPS satellite 300 as well as a carrier phase can be derived from the observation data 501.

FIG. 4 illustrates the pseudorange and the carrier phase in detail.

Each of the pseudorange and the carrier phase derived from the observation data 501 includes an error.

The positioning device 100 uses the reinforcement information 400 to eliminate the error included in each of the pseudorange and the carrier phase.

Note that in the following description, a pseudorange for L1 wave of a GPS satellite i will be denoted as P(i, 1), and a pseudorange for L2 wave of the GPS satellite i will be denoted as P(i, 2).

Moreover, a carrier phase for the L1 wave of the GPS satellite i will be denoted as φ) (i, 1), and a carrier phase for the L2 wave of the GPS satellite i will be denoted as φ) (i, 2).

3.2. Reinforcement Information

FIG. 5 illustrates a bias error and a noise source included in the observation data 501.

Errors resulting from the GPS satellite 300 include an orbit error, a satellite clock error, and an inter-frequency bias, and errors resulting from a signal propagation path include an ionospheric propagation delay error (also called an ionospheric delay error or an ionospheric delay amount) and a tropospheric propagation delay error (also called a tropospheric delay error or a tropospheric delay amount).

Errors resulting from a receiver of the positioning device 100 include a receiver clock error, a receiver noise and an error associated with multipath that is caused by an interference between a GPS signal reflected off a building and a GPS signal directly received from the GPS satellite 300.

Among these errors, the errors resulting from the receiver vary depending on the performance and a reception environment of the receiver of the positioning device 100 used by a user, and are thus not included in correction data and the reinforcement information but eliminated by processing of the positioning device 100.

The errors resulting from the GPS satellite 300 and the signal propagation path are compressed and distributed as the reinforcement information from the reinforcement information distribution satellite 200.

In addition to the errors illustrated in FIG. 5, errors resulting from an earth tide effect and a phase wind up effect that vary depending on the position of the positioning point are included in the correction data but not included in the reinforcement information.

FIG. 6 illustrates a breakdown of the reinforcement information taking the aforementioned points into consideration.

A ground station collects the observation data 501 from a reference point via a terrestrial channel and generates correction data.

The correction data is traditionally distributed as reinforcement information together with reliability information of the correction data at an update cycle of one second via a mobile phone or a wireless LAN (Local Area Network). However, the reinforcement information of the present embodiment is broadcast to users through a communication line of an artificial satellite with limited transmission capacity, so that the errors in the reinforcement information of the present embodiment are classified into a high rate and a low rate according to the degree of temporal fluctuations and subjected to time compression.

More specifically, the error classified under the high rate is updated every five seconds, while the error classified under the low rate is updated every 30 seconds.

While the conventional correction data is generated at each reference point set at intervals of about 10 to 30 km and distributed, the ionospheric delay error and the tropospheric delay error (with a spatial fluctuation) resulting from the signal path and included in the reinforcement information of the present embodiment are distributed only at every grid point (FIG. 7) with a 60-km radius to be subjected to space compression.

Furthermore, in the present embodiment, the errors included in the reinforcement information are classified into an error which is dependent on frequency (a frequency-dependent error) and an error which is independent of frequency (a frequency-independent error).

The frequency-independent error is classified as the high-rate error, and the frequency-dependent error is classified as the low-rate error.

Among the frequency-independent errors, the satellite clock error alone is updated every five seconds and distributed.

The other frequency-independent errors, namely the satellite orbit error, the inter-frequency bias and the tropospheric delay error, are updated every 30 seconds and distributed.

However, for each of the satellite orbit error, the inter-frequency bias and the tropospheric delay error, a variation from the error updated every 30 seconds is added every five seconds as a correction value to the satellite clock error (updated every five seconds and distributed).

In other words, during 30 seconds, five correction values (30 seconds/5 seconds−1=5) for each of the satellite orbit error, the inter-frequency bias and the tropospheric delay error are added to the satellite clock error updated every five seconds.

As a result, the positioning device 100 can receive an updated value of each of the satellite orbit error, the inter-frequency bias and the tropospheric delay error every 30 seconds as well as receive the correction value of each of the satellite orbit error, the inter-frequency bias and the tropospheric delay error every five seconds.

The positioning device 100 then adds the correction value received every five seconds to the updated value received every 30 seconds to be able to perform correction on the satellite orbit error, the inter-frequency bias and the tropospheric delay error every five seconds.

The correction value for each of the satellite orbit error, the inter-frequency bias and the tropospheric delay error obtained every five seconds and added to the satellite clock error is also called a consistency.

In the present embodiment, the data volume of the reinforcement information is compressed by distributing the consistency every five seconds.

Note that the inter-frequency bias is based on an L1 signal and represents a delay amount within a satellite payload of each signal, where an inter-frequency bias (L1 bias) is '0' and an inter-frequency bias (L2 bias) represents a delay amount of an L2 carrier signal with respect to an L1 carrier signal 'L2−L1'.

An inter-frequency bias (L0 bias) represents a frequency-independent term of the inter-frequency bias and is calculated from the inter-frequency bias (L1 bias) and the inter-frequency bias (L2 bias) as expressed by expression 1 in FIG. 6.

The inter-frequency bias based on the L1 signal may also be based on another signal without any problem, where the same effect can be expected when an L5 signal is used.

4. Configuration Example of Positioning Device

Figure 8:
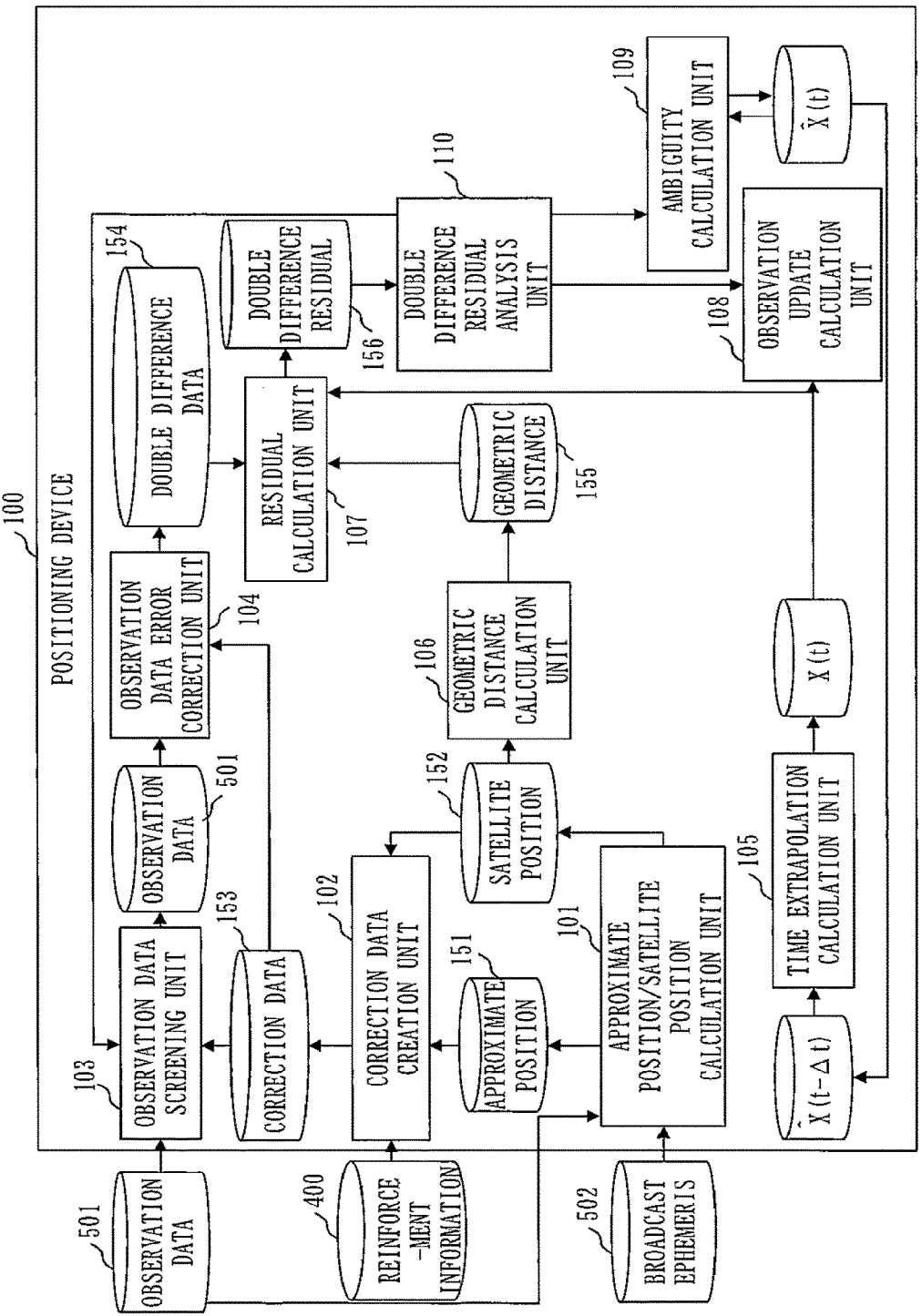
FIG. 8 is a diagram illustrating a configuration example of the positioning device according to the first embodiment.

FIG. 8 is a diagram illustrating a configuration example of the positioning device 100 according to the present embodiment.

FIG. 9 illustrates a brief description of each component illustrated in FIG. 8, and FIG. 10 illustrates a brief description of intermediate data.

An approximate position/satellite position calculation unit 101 receives the observation data 501 and the broadcast ephemeris 502 from the GPS satellite 300 and calculates an approximate position of the positioning point and a position of each GPS satellite 300.

An approximate position 151 and a satellite position 152 are calculation results of the approximate position/satellite position calculation unit 101.

The approximate position 151 is a position of the positioning point that is calculated by independent positioning and accurate on the order of meters.

The satellite position 152 is a position of each GPS satellite 300 from which the positioning device 100 receives the observation data.

A correction data creation unit 102 receives the reinforcement information 400 from the reinforcement information distribution satellite 200 as well as acquires the approximate position 151 and the satellite position 152 to calculate correction data 153 from the reinforcement information 400, the approximate position 151 and the satellite position 152.

The correction data 153 indicates an error expected to be included in the observation data 501 that is received at the positioning point from each GPS satellite 300.

An observation data screening unit 103 eliminates the observation data 501 that is expected to be degraded in quality.

The observation data screening unit 103 corresponds to an example of a least squares method positioning execution unit, a sum-of-squares calculation unit, a normalization unit and an evaluation unit.

An observation data error correction unit 104 performs double difference calculation to output double difference data 154 of the observation data.

The double difference data 154 indicates a value obtained by subtracting observation data of a master satellite (observation data already corrected by using the correction data 153) from observation data of a slave satellite (observation data already corrected by using the correction data 153).

The double difference calculation and the double difference data 154 will be described later.

A time extrapolation calculation unit 105 performs time extrapolation calculation to estimate a state quantity $X(t)$ of a current epoch from a state quantity $\check{X}(t-\Delta t)$ of a previous epoch.

Note that notation in which " ˇ " lies directly above "X" in FIG. 8 is identical in meaning to the notation in which " ˇ " lies at the upper right of "X" ("$X\check{\ }$").

Moreover, " ˇ " indicates a state quantity after being updated by an observation update calculation unit 108 to be described.

A geometric distance calculation unit 106 calculates a geometric distance 155 from the GPS satellite 300 to the positioning point on the basis of the satellite position 152.

A residual calculation unit 107 calculates a double difference residual 156 from the double difference data 154 and the geometric distance 155.

The observation update calculation unit 108 updates the state quantity $X(t)$ such that the state quantity $X(t)$ has the smallest estimated error.

The state quantity $X(t)$ after being updated by the observation update calculation unit 108 is denoted as the state quantity $X\hat{\ }(t)$.

An ambiguity calculation unit 109 calculates ambiguity being a bias amount of the carrier phase and updates the state quantity $X\hat{\ }(t)$ on the basis of the calculation result.

A value of the position included in the state quantity $X\hat{\ }(t)$ updated by the ambiguity calculation unit 109 is output as a positioning result.

Moreover, the state quantity $X\hat{\ }(t)$ updated by the ambiguity calculation unit 109 is subjected to the time extrapolation calculation by the time extrapolation calculation unit 105 as the state quantity $X\hat{\ }(t-\Delta t)$ of the previous epoch.

A double difference residual analysis unit 110 identifies observation data suspected of being influenced by the multipath, and notifies the observation data screening unit 103 of the observation data suspected of being influenced by the multipath.

Moreover, the double difference residual analysis unit 110 instructs the ambiguity calculation unit 109 to recalculate the ambiguity when a cycle slip is suspected.

The double difference residual analysis unit 110 together with the observation data screening unit 103 corresponds to an example of the evaluation unit.

4.1. Observation Data Screening Unit 103

Here, an operation of the observation data screening unit 103 will be described in detail.

The observation data screening unit 103 employs a residual detection and elimination scheme using a single difference to detect, from among a plurality of pieces of observation data, the observation data influenced by the multipath and eliminate the observation data being detected.

Figure 11:
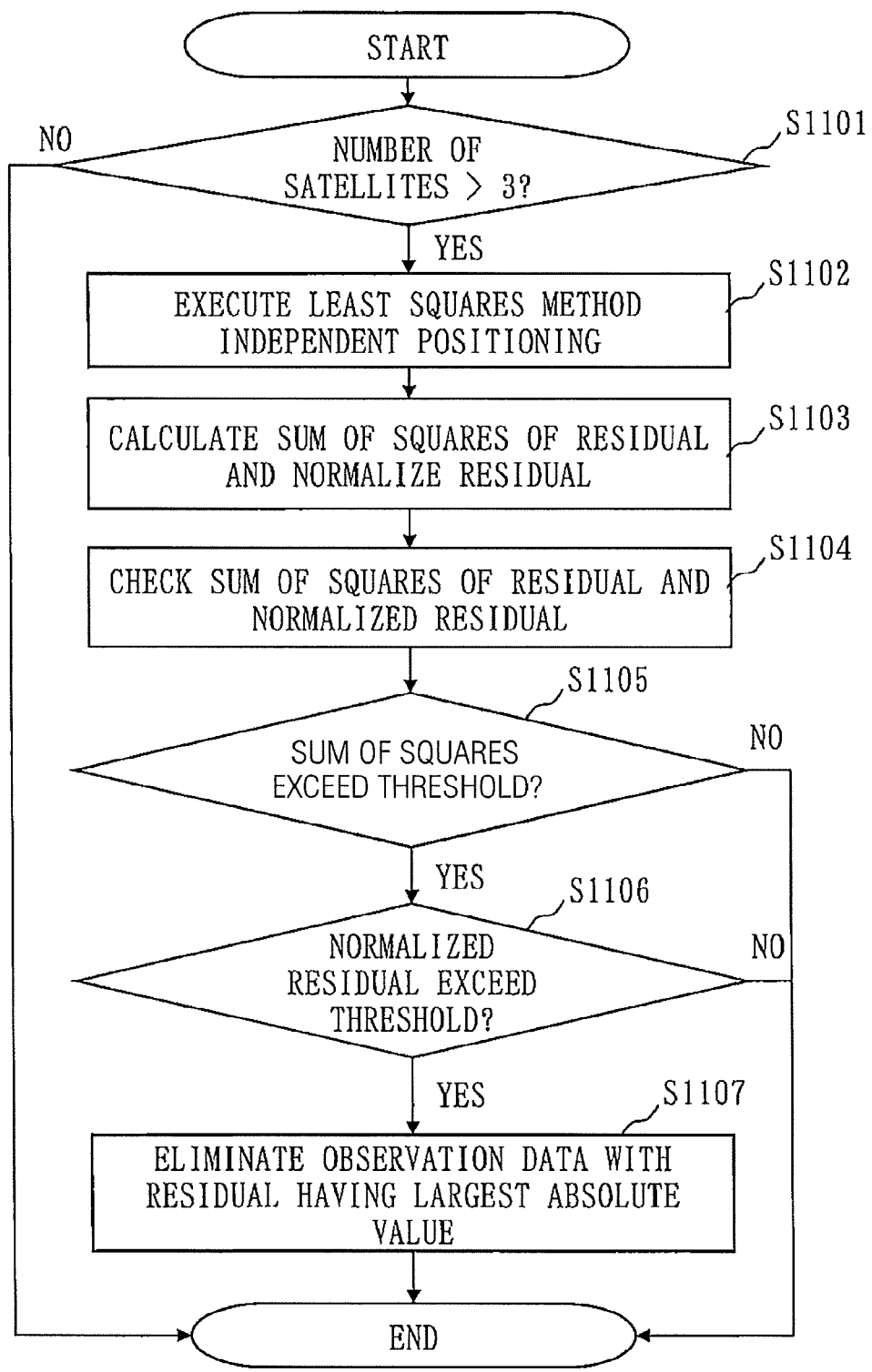
FIG. 11 is a flowchart illustrating an operational example of an observation data screening unit according to the first embodiment.

FIG. 11 illustrates an operational example of the observation data screening unit 103.

The operational example of the observation data screening unit 103 will be described below with reference to FIG. 11.

When three or more of the GPS satellites 300 are acquired (YES in S1101), the observation data screening unit 103 executes least squares method positioning (S1102) in which a single difference amount (hereinafter simply referred to as a single difference as well) of an L1-wave pseudorange to be described in section 4.2.1 is used as an observation amount.

That is, the observation data screening unit 103 executes the least squares method positioning by using, as the observation amount, n (n is an integer of 3 or larger) number of single difference amounts of the L1-wave pseudorange obtained from n pieces of the observation data 501 from n number of the GPS satellites 300 and n pieces of the correction data 153 corresponding to the n pieces of the observation data 501.

A procedure of the least squares method positioning is illustrated in FIG. 16, and a calculation expression of the least squares method positioning is illustrated in FIGS. 17 and 18.

The procedure of the least squares method positioning in FIG. 16 and the calculation expression of the least squares method positioning in FIGS. 17 and 18 are already known and thus will not be described.

The least squares method positioning is executed to be able to obtain a residual of the observation amount for each GPS satellite 300.

That is, n number of residuals are obtained for n number of the GPS satellites 300.

A variation among the n number of residuals obtained by the least squares method positioning is larger when the observation data includes the multipath than when the observation data does not include the multipath.

Moreover, each of the n number of residuals is larger in magnitude when the observation data includes the multipath than when the observation data does not include the multipath.

The observation data screening unit 103 calculates a sum of squares of the residual of the observation amount of each satellite (calculates a sum of squares of then number of residuals) to evaluate the variation in the magnitude among the n number of residuals (S1103).

The observation data screening unit 103 further normalizes then number of residuals (S1103).

A calculation expression of the sum of squares and a normalization calculation expression are as follows.

Note that in the following expressions, R represents observation noise, H represents an observation matrix, n represents the number of satellites acquired, and indices i and j represent satellite numbers.

A matrix M is a matrix which represents an expected variance of the residual.

Where an expected value of A is denoted as E<A>, an element M(i, j) of M with i rows and j columns is represented as M(i, j)=E<dz(i)*dz(j)

$$R = \sigma^2 E_n \leftarrow \begin{cases} \sigma = \text{normalization parameter} \\ E_n = n \times n \text{ identity matrix} \end{cases} \quad \text{[Expression 1]}$$

$$M = H \frac{1}{H^T R^{-1} H} H^T + R$$

Sum of squares of residual:

$$zz = \sum_{i=1}^{n} \sum_{j=1}^{n} dz_i M_{ij}^{-1} dz_j$$

Normalization of residual: $zn_i = \dfrac{dz_i}{\sqrt{M_{ii}}}$

Next, the observation data screening unit 103 compares a sum of squares zz of the residual with a threshold (first threshold) (S1104 and S1105).

When the sum of squares zz of the residual does not exceed the threshold (NO in S1105), the observation data screening unit 103 determines that the multipath is not included in any of the n pieces of the observation data and ends the processing.

On the other hand, when the sum of squares zz of the residual exceeds the threshold (YES in S1105), the observation data screening unit 103 compares each of n number of normalized residuals $zn_i$ with a threshold (second threshold) (S1104 and S1106).

When none of the n number of normalized residuals $zn_i$ exceeds the threshold (NO in S1106), the observation data screening unit 103 determines that the multipath is not included in any of the n pieces of the observation data and ends the processing.

On the other hand, when at least one of the n number of normalized residuals $zn_i$ exceeds the threshold (YES in S1106), the observation data screening unit 103 discards, as data including the multipath, a piece of observation data from the GPS satellite 300 corresponding to the residual $zn_i$ having the largest absolute value among the n number of normalized residuals zn, (S1107).

The observation data screening unit 103 also eliminates observation data satisfying any of the following conditions 1) to 3) as data suspected of including the multipath.

1) Signal intensity is lower than a threshold (third threshold) being set

The observation data includes signal intensity of a GPS signal.

The observation data including the multipath tends to have lower signal intensity, whereby the observation data screening unit 103 eliminates the observation data with the signal intensity lower than the threshold.

2) Satellite elevation angle is smaller than a threshold (mask angle) (fourth threshold) being set The observation data from the GPS satellite with a low elevation angle passes through long distances of an ionosphere and a troposphere and is highly likely to be reflected off a building, whereby the observation data screening unit 103 eliminates the observation data from the GPS satellite with the low elevation angle.

3) Pseudorange double difference residual (refer to section 4.2.2) exceeds an estimated error (fifth error) estimated by Kalman filter The double difference residual analysis unit 110 compares the estimated error (observation value error) estimated to be included in a double difference observation amount by the Kalman filter with the pseudorange double difference residual and, when the pseudorange double difference residual exceeds the estimated error, the observation data screening unit 103 eliminates the corresponding observation data.

The estimated error by the Kalman filter is calculated by a diagonal component $\sigma_{ii}$ of a matrix $\sigma$ expressed by the following expression.

$$\sigma = HPH + R$$

For H and R, an observation matrix (FIG. 14) and observation noise (FIG. 14) used by the observation update calculation unit 108 in performing an observation update, are used respectively, and for P, an error covariance matrix (FIG. 14) estimated by the time extrapolation calculation unit 105 is used.

The double difference residual analysis unit 110 compares an observation value error of a pseudorange double difference of the GPS satellite having a satellite number i with a residual of the pseudorange double difference and, when the residual is larger, notifies the observation data screening unit 103 of the satellite number i so that the observation data screening unit 103 eliminates the observation data from the GPS satellite having the satellite number i.

The observation data screening unit 103 eliminates the observation data including the multipath as described above, whereby only the observation data not including the multipath is input to the observation data error correction unit 104.

Moreover, the observation data screening unit 103 selects a plurality of satellites from among the observed satellites, switches a selected satellite, executes the processing employing the residual detection and elimination scheme using the single difference as described above, executes multipath detection, and inputs the observation data from a combination of satellites having the smallest residual to the error correction unit 104.

In the satellite selection, the number of satellites being selected corresponds to the number of visible satellites at the maximum and, at the minimum, four satellites with which positioning calculation can be performed.

This selection is performed with all combinations of the visible satellites.

4.2.1. Double Difference Amount

The double difference calculation performed by the observation data error correction unit 104 will now be described.

Figure 12:
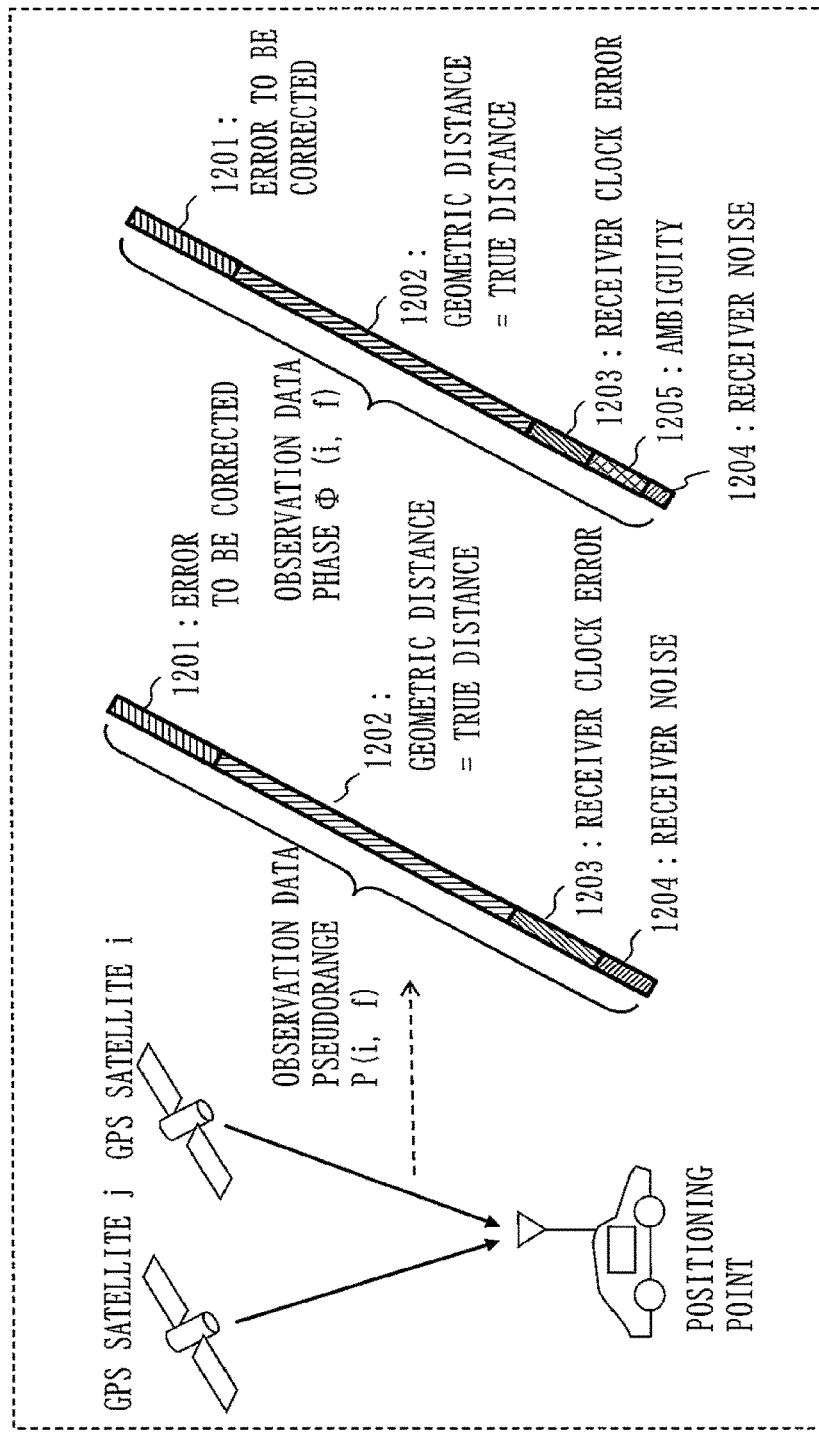
FIG. 12 is a diagram illustrating a breakdown of the observation data according to the first embodiment.
Figure 13:
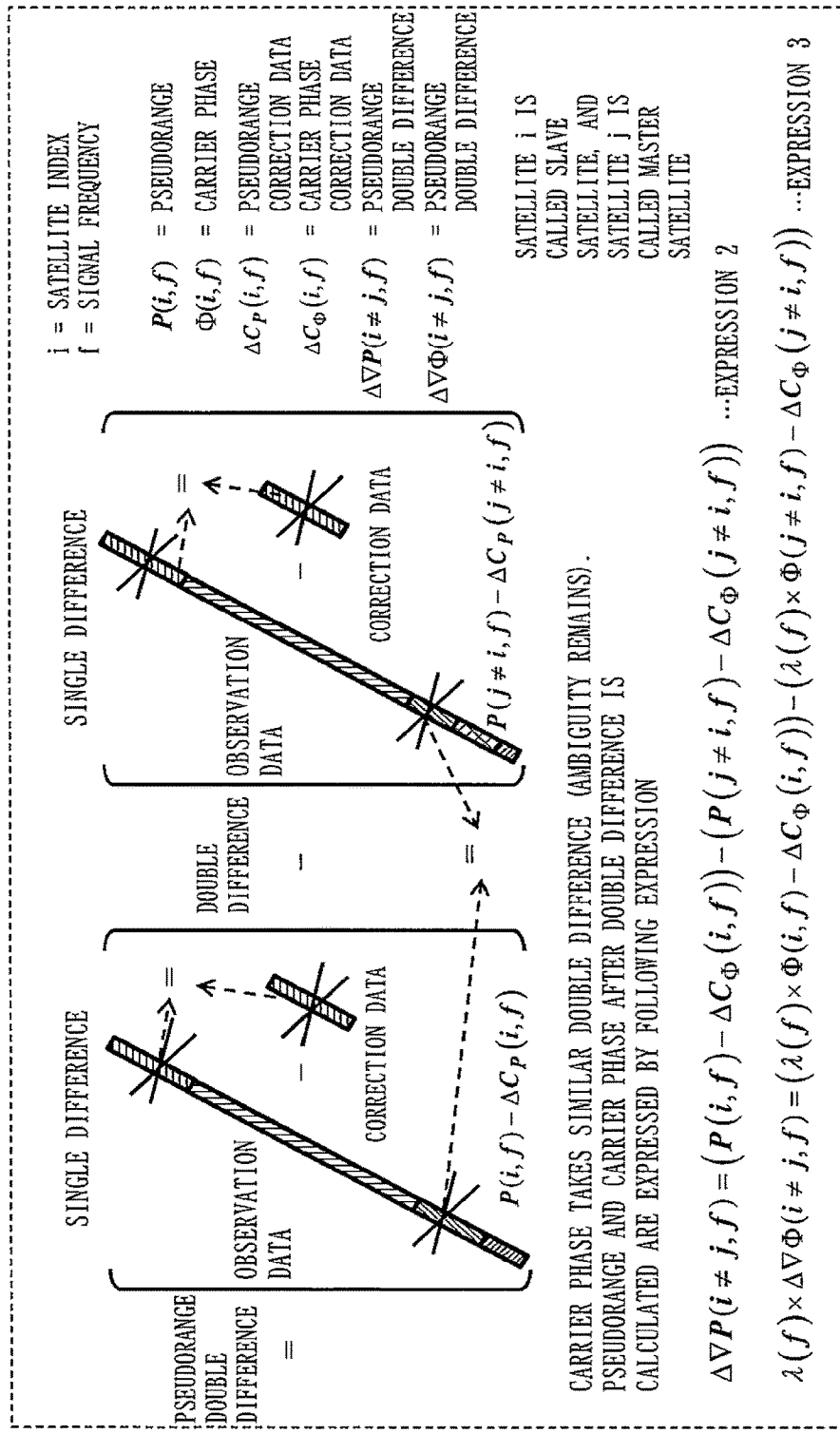
FIG. 13 is a diagram illustrating double difference calculation according to the first embodiment.

FIGS. 12 and 13 illustrate the double difference calculation.

The observation data includes the pseudorange and the carrier phase as illustrated in FIG. 4.

Each of the pseudorange and the carrier phase includes the error illustrated in section 3.2 and FIG. 6, where the error includes an amount included in the correction data (reference numeral 1201 in FIG. 12) as well as the receiver clock error (reference numeral 1203 in FIG. 12) and the receiver noise (reference numeral 1204 in FIG. 12) resulting from the receiver and not included in the correction data (the multipath is ignored in this case).

A portion obtained by eliminating all the errors is a true range (geometric distance indicated with reference numeral 1202 in FIG. 12) between the positioning point and the GPS satellite 300. The error amount (reference numeral 1201 in FIG. 12) included in the correction data is eliminated by subtracting the correction data from the observation data (the pseudorange and the carrier phase) from each GPS satellite 300.

The error amount obtained after subtracting the correction data from the observation data (the pseudorange and the carrier phase) is called a single difference amount.

When a certain GPS satellite is determined to be a master satellite (a GPS satellite near the zenith is usually selected) and a GPS satellite other than the master satellite is determined to be a slave satellite, a single difference of the master satellite is subtracted from a single difference of the slave satellite.

As illustrated in FIG. 13, the single difference of the slave satellite and the single difference of the master satellite are single differences of a common receiver, so that the receiver clock error (reference numeral 1203 in FIG. 12) included in the single difference of the slave satellite is equal to the receiver clock error included in the single difference of the master satellite.

Therefore, the receiver clock error (reference numeral 1203 in FIG. 12) is cancelled by subtracting the single difference of the master satellite from the single difference of the slave satellite.

An error amount obtained after eliminating the receiver clock error is called a double difference amount (or simply called a double difference).

The main error is eliminated by calculating the double difference amount, and there remain the geometric distance (reference numeral 1202 in FIG. 12), the receiver noise (reference numeral 1204 in FIG. 12) and the ambiguity (reference numeral 1205 in FIG. 12, only the carrier phase).

The receiver noise equals zero when time-averaged and can thus be eliminated by performing statistical processing (Kalman filter in section 4.2.2 to be described) in the process of continuing the observation.

The ambiguity can be estimated by using the pseudorange from which the error is eliminated (refer to section 4.2.3 to be described) and, as a result, the position can be estimated with high accuracy.

4.2.2. Kalman Filter

The Kalman filter realizing the time extrapolation calculation unit 105 and the observation update calculation unit 108 in FIGS. 8 and 9 will be described.

Figure 14:
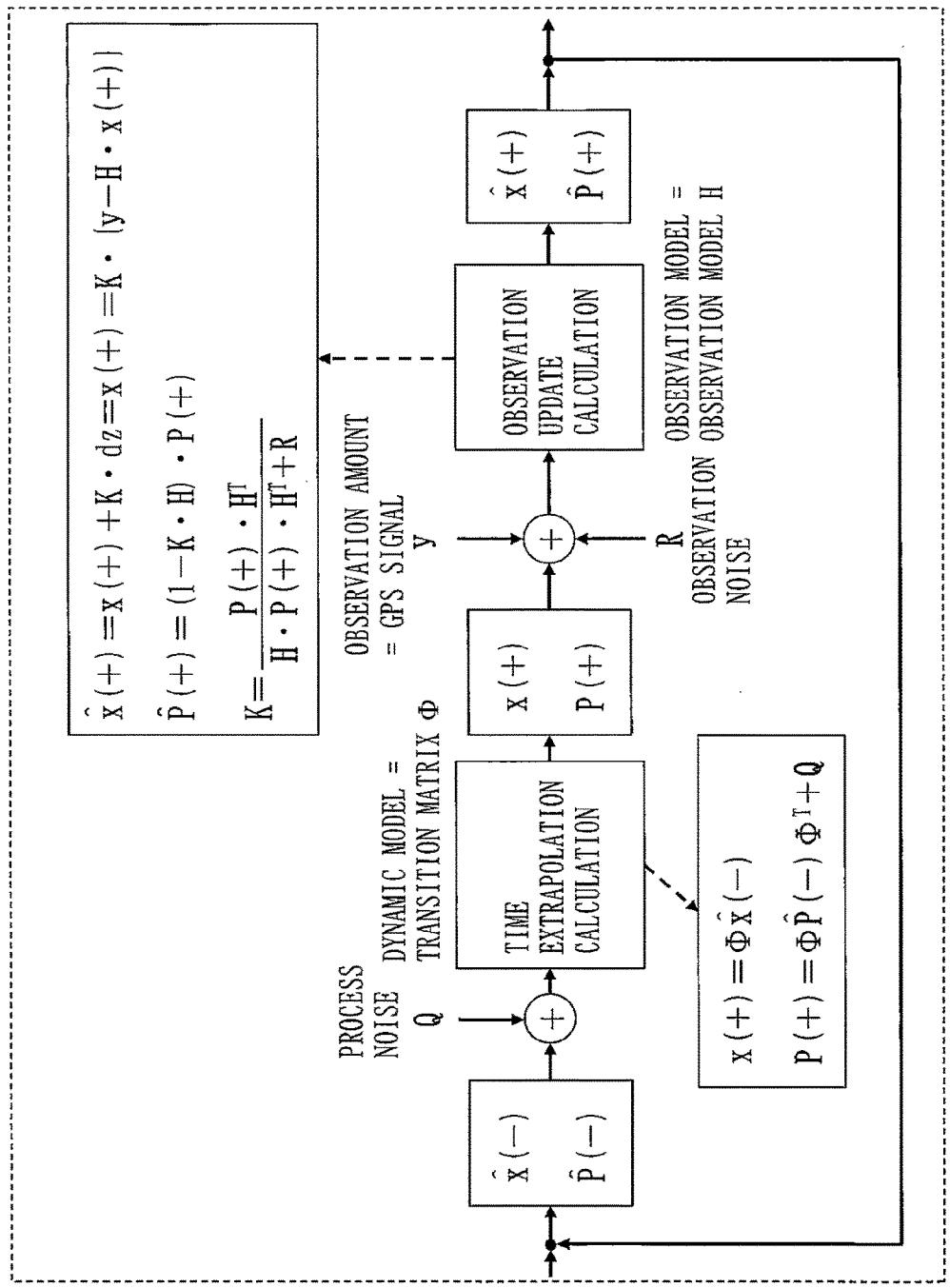
FIG. 14 is a diagram illustrating a processing flow of a Kalman filter according to the first embodiment.

FIG. 14 illustrates a processing flow of the Kalman filter.

FIG. 15 illustrates a description of a variable used in the processing of the Kalman filter.

The time extrapolation calculation unit 105 in FIG. 8 performs time extrapolation calculation using the Kalman filter illustrated in FIG. 14.

The observation update calculation unit 108 in FIG. 8 performs observation update calculation of the Kalman filter illustrated in FIG. 14.

The time extrapolation calculation and the observation update calculation form a loop, and the loop formed by the time extrapolation calculation and the observation update calculation is executed repeatedly.

The Kalman filter estimates the state quantity such that a diagonal component of an error covariance (error covariance matrix $P_{ij} = E\langle x_i x_j \rangle$, where $E\langle a \rangle$ is a variance of "a") of the state quantity (state quantity X) to be estimated is the smallest in each loop being repeated.

The processing of the Kalman filter will be described in due order.

In the time extrapolation calculation, from a state quantity ($\hat{x}(-)$) and an error covariance matrix ($\hat{P}(-)$) of a previous time, a state quantity ($x(+)$) and an error covariance matrix ($P(+)$) of a following time are estimated based on a transition matrix $\phi$ determined according to a dynamic model being adopted.

At this time, process noise Q that is an error expected between the dynamic model and an actual phenomenon is added to the error covariance matrix ($\hat{P}(-)$).

The process noise Q is also determined according to the adopted dynamic model and design.

From the estimated state quantity ($x(+)$), an amount y equivalent to an observation amount ($\bar{y}$ represents that "−" lies directly above "y"; the same applies hereinafter) is obtained, the amount $\bar{y}$ being estimated by an observation model ($\bar{y}=f(x)$) expressing a relationship between the state quantity and the observation amount.

In the observation update calculation, a residual ($dz=y-\bar{y}$) being a difference between an actual observation amount and the estimated observation amount is obtained to then be converted into a difference in the state quantity ($dx=K \cdot dz$) by using Kalman gain K expressed in an expression in FIG. 14 and update the state quantity.

An observation matrix used in the observation update calculation expresses the observation model and is obtained by the following expression.

$$dz=H \cdot dx(dz=y-\bar{y}=f(\hat{x})-f(x)=\nabla_x f \cdot dx = H \cdot dx) \quad \text{[Expression 2]}$$

R included in the denominator of the expression of the Kalman gain K represents observation noise expected to be included in the observation amount.

4.2.3. Ambiguity Calculation

Next, ambiguity calculation performed by the ambiguity calculation unit 109 in FIGS. 8 and 9 will be described.

In order to realize highly accurate positioning, it is conventionally required to perform positioning by using a carrier phase with which the receiver noise is on the order of millimeters (refer to FIG. 4).

The ambiguity being a bias amount is included in the carrier phase but cannot be eliminated by the double difference calculation (refer to section 4.2.1), so that the positioning device 100 needs to estimate the ambiguity by adding the ambiguity to the state quantity (position and velocity) and eliminate the ambiguity.

A procedure of eliminating the ambiguity is described in a list below.

(1) Estimate a position by using the pseudorange (refer to sections 4.2.1 and 4.2.2).

(2) With the geometric distance found from the position obtained in (1), estimate the ambiguity from the carrier phase (refer to section 4.2.1).

(3) Repeat (1) and (2) for a while to make a variance of the state quantity (position, velocity, and ambiguity) statistically small.

(4) Use a method called a LAMBDA method to determine an integer value (called a Fix solution) of the ambiguity (the ambiguity has an integer value; refer to FIG. 4) that has a decimal value (called a Float solution) at the time of step (3).

(5) Verify whether the Fix solution is correct and, when correct, fix the ambiguity to update the position corresponding to the difference between the Float solution and the Fix solution and realize the accuracy on the order of centimeters.

The LAMBDA method is a method of using the Float solution of the ambiguity and an error covariance matrix with a component corresponding to the Float solution as inputs, and searching for the Fix solution that results in the smallest square sum average of the difference between the Float solution and the Fix solution from a hyperdimensional ellipsoid sphere determined by the magnitude of the error covariance with the Float solution as the center.

It is hyperdimensional since the number of Float solutions corresponds to the number of double differences (=number of satellites−1), and the ellipsoid sphere instead of a sphere is used since a non-diagonal component of the error covariance matrix is not zero.

The determination in the verification in (5) is made on the basis of information such as the magnitude of the residual using the Fix solution.

Second Embodiment

5. Measures Against Cycle Slip

In the present embodiment, measures taken by the double difference residual analysis unit 110 in FIG. 8 against a cycle slip will be described.

Ambiguity of a carrier phase remains constant while the positioning device 100 keeps receiving a GPS signal (while acquiring the GPS satellite).

When the positioning device 100 reacquires the GPS satellite 300 after the acquisition is once interrupted, however, the ambiguity is sometimes offset to another value (which is called the cycle slip).

Once the cycle slip occurs, a discrepancy caused by the offset degrades positioning accuracy when using the ambiguity retained by the positioning device 100 before reacquisition.

Thus, as with the multipath, areas such as urban and mountainous areas in which acquisition of the GPS satellite is frequently interrupted require measures against the cycle slip in order to achieve highly accurate positioning.

The double difference residual analysis unit 110 compares, for each GPS satellite 300, the double difference residual of the carrier phase (refer to section 4.2.2) with a threshold (sixth threshold).

When the double difference residual of the carrier phase exceeds the threshold, the double difference residual analysis unit 110 suspects that the cycle slip is generated and instructs the ambiguity calculation unit 109 to recalculate ambiguity of the GPS satellite 300, the double difference residual of the carrier phase of which exceeds the threshold.

The ambiguity calculation unit 109 recalculates the ambiguity of the GPS satellite for which the calculation of the ambiguity is instructed by the double difference residual analysis unit 110.

6. Variation

While the embodiments of the present invention have been described, two or more of those embodiments may be combined and implemented.

Alternatively, one of those embodiments may be partially implemented.

Yet alternatively, two or more of those embodiments may be partially combined and implemented.

Note that the present invention is not to be limited by those embodiments but can be modified in various manners as needed.

7. Example of Hardware Configuration

Lastly, an example of a hardware configuration of the positioning device 100 according to the first and second embodiments will be described with reference to FIG. 19.

The positioning device 100 is a computer that can implement each element of the positioning device 100 by a program.

The positioning device 100 has the hardware configuration in which an arithmetic device 901, an external storage 902, a main storage 903, a communication device 904 and an input/output device 905 are connected to a bus.

The arithmetic device 901 is a CPU (Central Processing Unit) executing the program.

The external storage 902 is a ROM (Read Only Memory), a flash memory and/or a hard disk device, for example.

The main storage 903 is a RAM (Random Access Memory).

The communication device 904 receives the observation data and the broadcast ephemeris from the GPS satellite and receives the reinforcement information from the reinforcement information distribution satellite.

The communication device 904 includes an AD (analog-digital) conversion function.

The input/output device 905 is a touch panel display, for example.

The program usually stored in the external storage 902 is sequentially read into the arithmetic device 901 and executed while loaded to the main storage 903.

The program is a program implementing the function that is described as " . . . unit" in FIG. 8.

Moreover, the external storage 902 stores an operating system (OS), at least a part of which is loaded to the main storage 903 so that the arithmetic device 901 executes the program implementing the function of the " . . . unit" in FIG. 8 while executing the OS.

Furthermore, the main storage 903 stores as a file a piece of information, data, a signal value and a variable value representing the result of the processing described as "correction of . . . ", "generation of . . . ", "creation of . . . ", "computation of . . . ", "calculation of . . . ", "determination of . . . ", "evaluation of . . . ", "update of . . . ", "estimation of . . . ", "extraction of . . . ", "selection of . . . ", "reception of . . . " and the like in the first and second embodiments.

Figure 19:
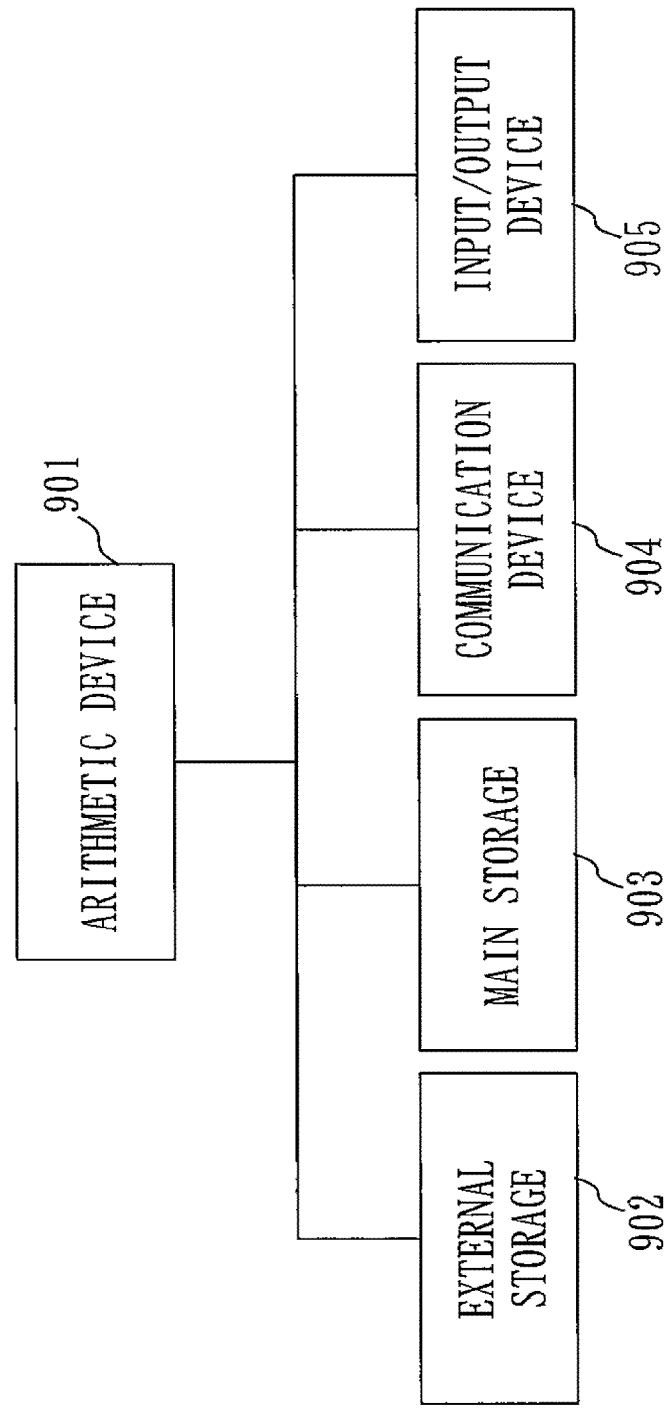
FIG. 19 is a diagram illustrating an example of a hardware configuration of the positioning device according to the first and second embodiments.

Note that the configuration in FIG. 19 merely illustrates an example of the hardware configuration of the positioning device 100, which may thus have the hardware configuration that is not necessarily the configuration illustrated in FIG. 19 but another configuration.

REFERENCE SIGNS LIST

100: positioning device, 101: approximate position/satellite position calculation unit, 102: correction data creation unit, 103: observation data screening unit, 104: observation data error correction unit, 105: time extrapolation calculation unit, 106: geometric distance calculation unit, 107: residual calculation unit, 108: observation update calculation unit, 109: ambiguity calculation unit, 110: double difference residual analysis unit, 200: reinforcement information distribution satellite, 300: GPS satellite, 400: reinforcement information, 501: observation data, and 502: broadcast ephemeris

The invention claimed is:

1. A positioning device comprising:
processing circuitry configured to:
execute least squares method positioning by using, as an observation amount, n, n is an integer of 3 or larger, number of single difference amounts of an L1-wave pseudorange obtained from n pieces of observation data from n number of positioning satellites and n pieces of correction data corresponding to the n pieces of observation data,
calculate a sum of squares of n residuals obtained for each positioning satellite by executing the least squares method positioning,
normalize the n residuals,
evaluate the calculated sum of squares and the normalized n residuals, and
apply correction to the n pieces of observation data used for positioning based on the evaluation.

2. The positioning device according to claim 1, wherein processing circuitry is further configured to evaluate by being configured to
compare the sum of squares with a first threshold,
compare each of the n normalized residuals with a second threshold, and
discard any of the n pieces of observation data when the sum of squares exceeds the first threshold and when at least any of the n normalized residuals exceeds the second threshold.

3. The positioning device according to claim 2, wherein processing circuitry is further configured to evaluate by being configured to discard, from among the n pieces of observation data, a piece of observation data from a positioning satellite with the normalized residual having the largest absolute value.

4. The positioning device according to claim 1, wherein the processing circuitry is further configured to evaluate by being configured to, for each positioning satellite, compare signal intensity of a positioning signal with a third threshold and discard observation data from a positioning satellite with the signal intensity of the positioning signal falling below the third threshold.

5. The positioning device according to claim 1, wherein the processing circuitry is further configured to evaluate by being configured to, for each positioning satellite, a satellite elevation angle with a fourth threshold and discard observation data from a positioning satellite with the satellite elevation angle falling below the fourth threshold.

6. The positioning device according to claim 1, wherein the processing circuitry is further configured to evaluate by being configured to, for each positioning satellite, a pseudorange double difference residual with a fifth threshold and discard observation data from a positioning satellite with the pseudorange double difference residual exceeding the fifth threshold.

7. The positioning device according to claim 1,
wherein the processing circuitry is further configured to calculate ambiguity for each positioning satellite,
wherein the processing circuitry is further configured to evaluate by being configured to compare a carrier phase double difference residual with a sixth threshold for each positioning satellite, and
wherein the processing circuitry is further configured to recalculate ambiguity of a positioning satellite with the carrier phase double difference residual exceeding the sixth threshold.

8. A positioning device comprising:
processing circuitry configured to:
select a combination of n number of positioning satellites, 3≤n<m, among observation amount obtained from m number of single difference amounts of an L1-wave pseudorange obtained from m pieces of observation data transmitted from m number of positioning satellites observed and m pieces of correction data corresponding to the m pieces of observation data, and
execute least squares method positioning for each combination, calculate a sum of squares of n residuals obtained for each positioning satellite by executing the least squares method positioning, normalize the n residuals, and evaluate the calculated sum of squares and the normalized n residuals, and apply correction to the m pieces of observation data used for positioning based on the evaluation.

9. The positioning device according to claim 8, wherein the processing circuitry is further configured to evaluate by being configured to compare the sum of squares with a first threshold, compare each of the n normalized residuals with a second threshold, and discard any of the m pieces of observation data when the sum of squares exceeds the first threshold and when at least any of the n normalized residuals exceeds the second threshold.

10. The positioning device according to claim 9, wherein processing circuitry is further configured to evaluate by being configured to discard, from among the m pieces of observation data, a piece of observation data from a positioning satellite with the normalized residual having the largest absolute value.

11. The positioning device according to claim 8, wherein processing circuitry is further configured to evaluate by being configured to perform positioning calculation using n pieces of observation data of a combination with a smallest sum of squares calculated from among selected combinations.

* * * * *